April 18, 1950     E. W. WINELAND     2,504,941

WINDING DEVICE FOR FISHING LINES

Filed Feb. 5, 1947

INVENTOR
EARL W. WINELAND
BY *Archworth Martin*
ATTORNEY

Patented Apr. 18, 1950

2,504,941

UNITED STATES PATENT OFFICE 2,504,941

WINDING DEVICE FOR FISHING LINES

Earl W. Wineland, McKeesport, Pa., assignor of one-third to Norman Johnson and one-third to Harry Wineland, both of White Oak Borough, McKeesport, Pa.

Application February 5, 1947, Serial No. 726,493

3 Claims. (Cl. 242—104)

My invention relates to winding devices for fishing rods, and more particularly to shaft-supporting brackets that can be detachably connected thereto for the purpose of temporarily mounting line-drying reels or fishing-line spools thereon.

One object of my invention is to provide an attachment of the character referred to that can conveniently and rigidly be attached to a fishing rod and which, when removed from the rod, will have its various component parts readily disassemblage so that they can be packed into a small box for convenient carrying by the fisherman.

Another object of my invention is to provide an improved manner of mounting a drying reel on a fishing rod, so that a fishing line can be wound thereon from the operating reel more evenly and accurately than in the case of various previous types of line-drying reels, the arrangement having the further advantage that the line-drying reel and its supporting elements can be mounted closely to the fishing rod.

Figure 3:
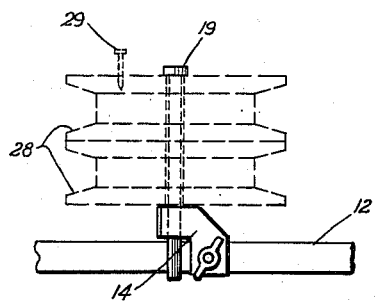
Figure 2:
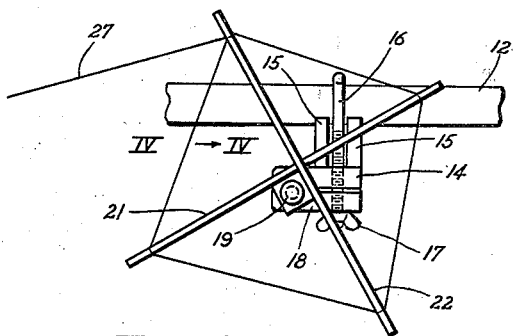
Figure 1:
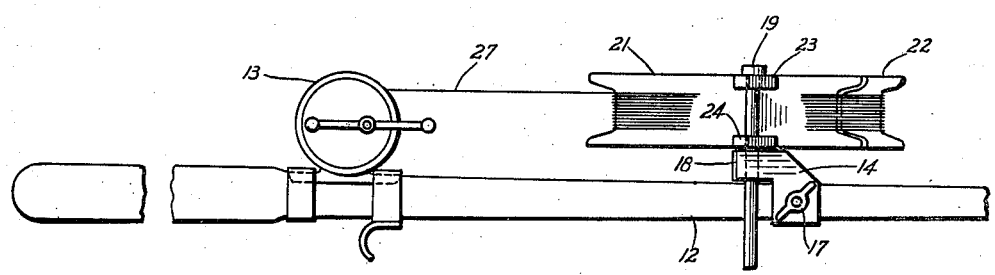
Figures 4, 5:
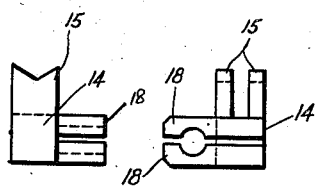
Figure 6:
Figure 7:
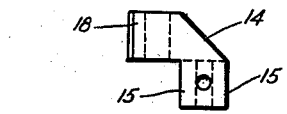
Figure 8:
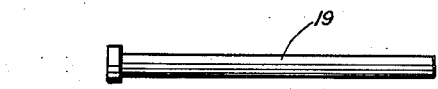
Figure 9:
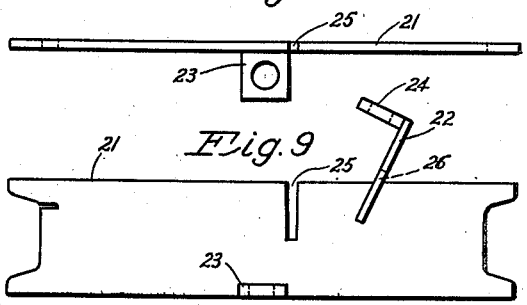
Figure 10:
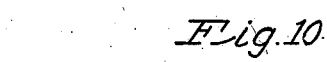

In the accompanying drawing, Figure 1 is a side view showing my device applied to a fishing rod; Fig. 2 is a plan view of a portion of the structure of Fig. 1; Fig. 3 is a side view of certain of the apparatus of Fig. 1, indicating the manner in which fishing-line spools may be temporarily mounted on the rod in place of the line-drying reel of Figs. 1 and 2; Fig. 4 is a view of the bracket member looking in the direction of the arrow IV—IV of Fig. 2; Fig. 5 is a plan view of the bracket; Fig. 6 is an end view of the bracket; Fig. 7 shows the hook bolt used in clamping the bracket to the fishing rod; Fig. 8 shows the shaft on which the reel and spools of Figs. 1 to 3 are mounted; Fig. 9 is an edge view of one of the plates used in forming the line-drying reel of Figs. 1 and 2, and Fig. 10 is a face view of one of the plates, and also showing a companion plate, in partly assembled relation.

The fishing rod 12 may be of any conventional form and having an operating reel 13 secured thereto, this reel being of any well known standard type and may suitably be of the level winding type. My attachment comprises a bracket member 14 that may be made of metal, a plastic, or gum wood. The bracket may suitably be cast in a single piece or cut from a single block and has two V-notched arm portions 15 that are engageable against the side of the rod 12 and clamped there by a hook bolt 16 that extends through the outer end of the block and between the arms 15, so that when its wing nut 17 is tightened, the bracket will be held tightly clamped in place on a rod of either large or small thickness.

The bracket has an upper portion 18 that is split, the split portions having semi-circular recesses to receive a shaft 19, the parts 18 being sprung slightly, so that when the pin or shaft 19 is inserted therein, they will grip it slightly, to provide sufficient friction against accidental displacement of the shaft. This shaft will serve to support either a drying reel or a spool.

The drying reel comprises two plates 21 and 22 which are of identical form. The plate 21 has a bearing block or flange 23 formed thereon, and the plate 22 carries a bearing block 24, these blocks being perforated for the reception of the shaft 19 when the reel plates are in assembled position as shown in Figs. 1 and 2.

Plates 21 and 22 respectively have slots 25 and 26 formed therein so that they can be brought into assembled relation with their bearing blocks 23 and 24 in axial alinement as shown more clearly in Fig. 1. The manner in which the plates are assembled is indicated in Fig. 10, wherein the plate 22 is placed in such position that its slot 26 receives the edge of the plate 21. Upon further tilting of the plate 22 and movement thereof further to the left, it can be pushed down in the slot 25 until its upper edge is flush with the upper edge of the plate 21. The slot walls of each plate have close-fitting engagement with the adjacent side surfaces of the other plate, so that the plates are held in their right-angular relationship with sufficient firmness to permit wrapping of a fishing line 27 thereon. The bracket will be attached to the rod whenever it is desired to wind a wet line on the drying reel, from the operating reel 13, or when it is desired to remove a dried line from the drying reel to the operating reel. In either case, smoothness and evenness of winding is facilitated by reason of the fact that the reel is positioned on a vertical axis that is close to the rod.

The bracket and the shaft 19 can also be used in the handling of fishing-line spools 28, either when removing new lines from the spools to the operating reel 13, or when it is desired to remove a line from the reel to a spool, as when it is desired to substitute another line. In using conventional line spools, a small nail 29 can be driven into the spool to serve as a convenient crank handle for turning the spool to winding a line thereon from the reel 13.

I claim as my invention:

1. A winding device for fishing lines, comprising a line-drying reel formed of plates that are approximately duplicates, each plate being slotted inwardly from one edge, for about one-half its width and approximately midway between its ends, and each plate having a shaft bearing on one face thereof, in the form of a perforated block and located adjacent to one of its edges and whose axial line is parallel to the slot, the slot walls of each plate being engageable with the sides of the other plate, when the plates are assembled, with their respective bearings in axial alinement, a shaft extending through the bearing blocks, and means for detachably connecting the shaft to a fishing rod.

2. A winding device for fishing lines, comprising a line-drying reel formed of plates that are approximately duplicates, each plate being slotted inwardly from one edge, for about one-half its width and approximately midway between its ends, and each plate having a shaft bearing on one face thereof, in the form of a perforated block and located adjacent to one of its edges and whose axial line is parallel to the slot, the slot walls of each plate being engageable with the sides of the other plate, when the plates are assembled, with their respective bearings in axial alinement, a shaft extending through the bearing blocks, having a head on its outer end engageable with an outer face portion of the reel, a bracket for yieldably gripping inner portions of the shaft, to hold the reel against the bracket, and means for connecting the bracket to a fishing rod.

3. A winding device for fishing lines, comprising a shaft for supporting a spool or reel and having a head on its outer end and engageable with the outer face of the spool, a bracket having a split arm for yieldably gripping the shaft at various points along its length, to hold the inner face of the spool against the arm, a second arm on the bracket, extending at right angles to the other arm, and means for connecting the second named arm to a fishing pole, the arms being relatively offset in directions axially of the shaft and parallel to the rod.

EARL W. WINELAND.

REFERENCES CITED

The following references are of record in the file of this patent:

UNITED STATES PATENTS

| Number | Name | Date |
|---|---|---|
| 769,548 | Laughton | Sept. 6, 1904 |
| 1,219,658 | Meyer | Mar. 20, 1917 |
| 1,279,667 | Deming | Sept. 24, 1918 |
| 1,355,322 | Feeney | Oct. 12, 1920 |
| 1,414,237 | Wanner | Apr. 25, 1922 |
| 1,467,834 | Bruch | Sept. 11, 1923 |
| 1,971,000 | Field | Aug. 21, 1934 |